Dec. 30, 1941.                G. F. NEUSCHAFER                2,268,417
              AUXILIARY HOLDER OR ADAPTER FOR CUT FILM
                      Filed May 24, 1940              2 Sheets-Sheet 1
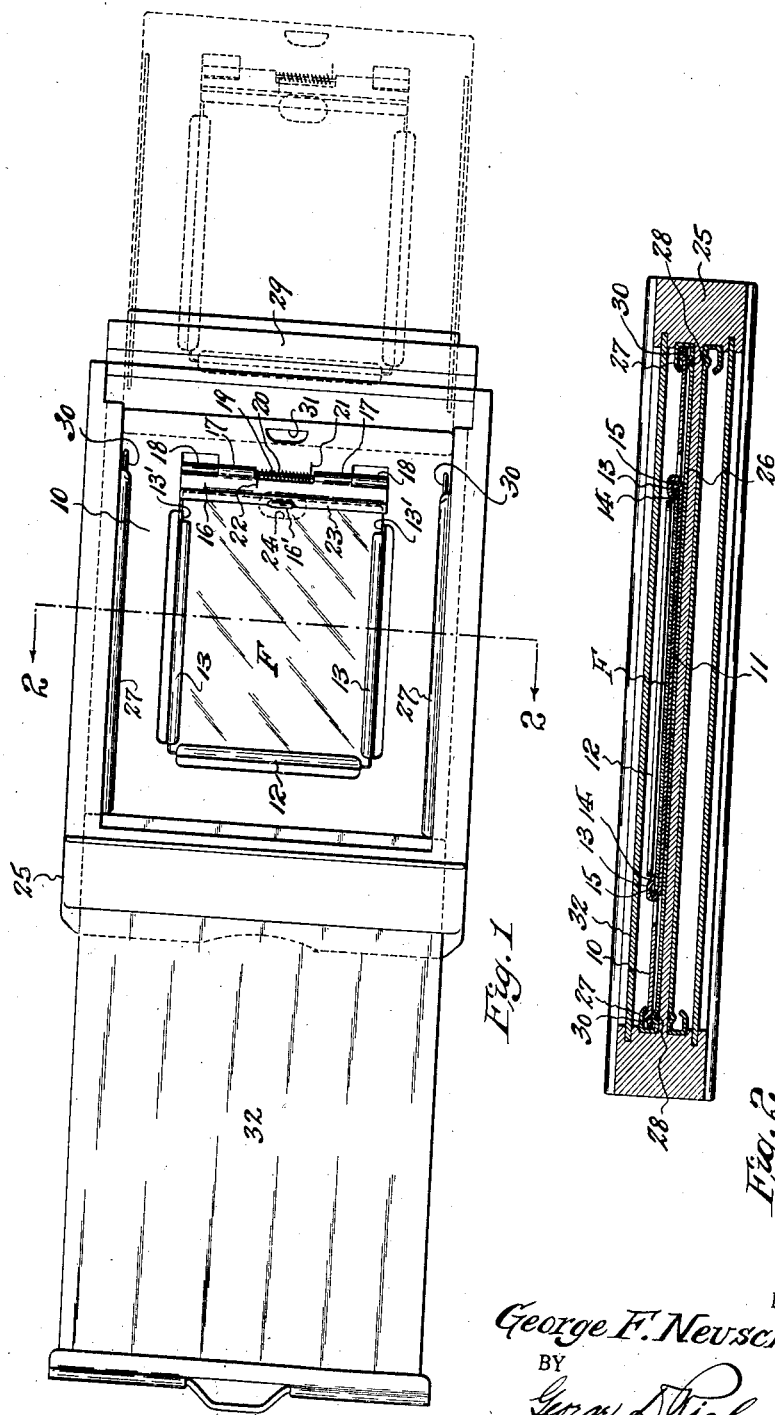
INVENTOR.
George F. Neuschafer,
BY
George D. Richards
ATTORNEY.

Dec. 30, 1941.   G. F. NEUSCHAFER   2,268,417
AUXILIARY HOLDER OR ADAPTER FOR CUT FILM
Filed May 24, 1940   2 Sheets-Sheet 2

INVENTOR.
George F. Neuschafer,
BY
George D. Richards
ATTORNEY.

Patented Dec. 30, 1941

2,268,417

UNITED STATES PATENT OFFICE 2,268,417

AUXILIARY HOLDER OR ADAPTER FOR CUT FILM

George F. Neuschafer, Chatham, N. J.

Application May 24, 1940, Serial No. 336,940

3 Claims. (Cl. 95—68)

This invention relates to auxiliary means for mounting cut-film or plates in photographic camera plate-holders; and the invention has reference, more particularly, to an auxiliary holder or adapter which may be removably inserted in a plate-holder so as to properly locate and support therein cut-film or the like of dimensions smaller than the plate-holder itself is sized to normally accommodate.

The invention has for an object to provide a novel auxiliary holder or adapter for the purposes stated which is operatively engageable with the normal cut-film holding and gripping devices of a camera plate-holder, and which itself is provided with novel means to, in turn, receive, suitably locate, and support, for photographic exposure within a camera, cut-film or the like of reduced or smaller than normal size.

The invention has for another object to provide a simple, inexpensive and yet efficient auxiliary small size cut-film holder or adapter which is easily applicable to the plate-holder equipment of a camera, and which is capable of easy insertion therein and removal therefrom; and a still further object of the invention is to provide such auxiliary holder or adapter with novel means for mounting cut-film or the like thereon in a proper location aligned with the optical center of the camera lens, and including means to securely retain the mounted cut-film against shifting or other accidental displacement.

Other objects of this invention, not at this time more particularly enumerated, will be understood from the following detailed description of the same.

Figure 3:
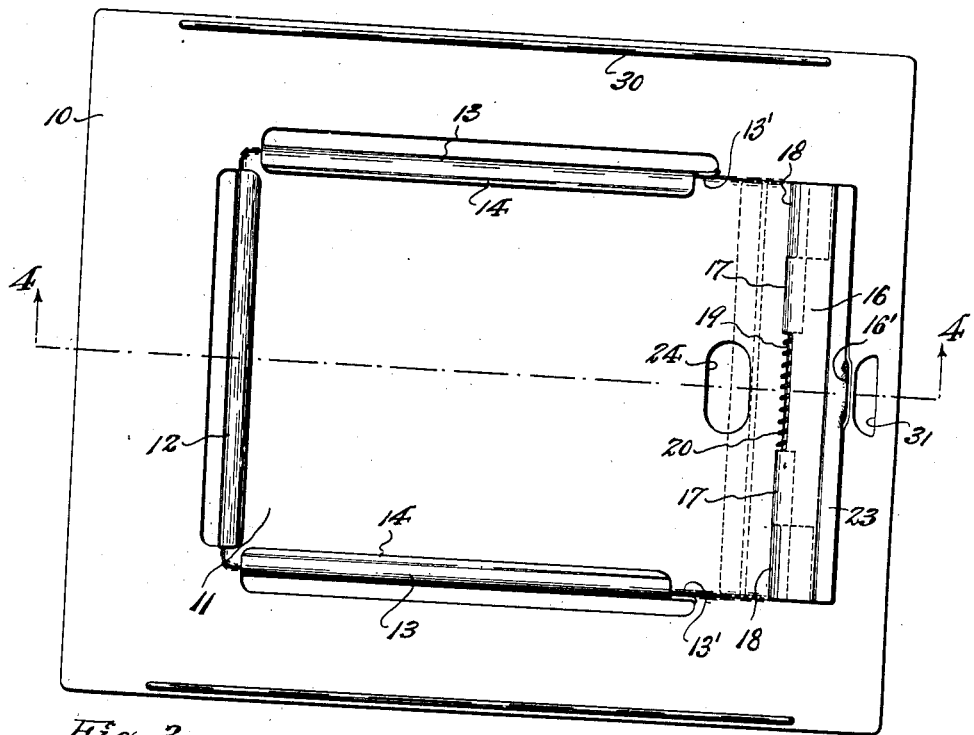
Figure 4:
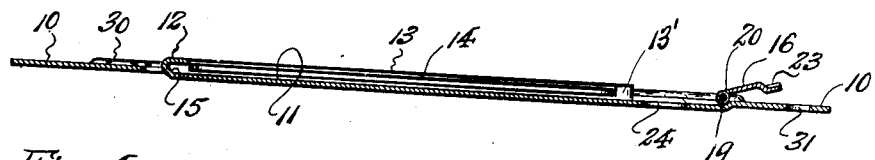

An illustrative embodiment of this invention is shown in the accompanying drawings, in which:

Fig. 1 is a face or plan view of a camera plate-holder with a slide panel thereof open to expose its interior, and showing the novel auxiliary holder or adapter operatively entered therein, the withdrawn condition of said auxiliary holder or adapter being indicated by dotted lines; Fig. 2 is a transverse section taken on line 2—2 in Fig. 1, but drawn on an enlarged scale; Fig. 3 is an enlarged plan view of the auxiliary holder or adapter per se, showing a film retaining element thereof in open position to permit insertion or withdrawal of cut-film, the closed position of said retaining element being indicated by dotted lines; and Fig. 4 is a longitudinal sectional view, taken on line 4—4 in Fig. 3.

Similar characters of reference are employed in the above-described views, to indicate corresponding parts.

The novel auxiliary holder or adapter for cut-film or the like comprises a flat body member 10 made of a suitable sheet material, preferably a light-gauge sheet metal, although it may well be made of other kinds of sheet material, such, e. g., as fibre board or the like. In a substantially central portion of its area, said body member is slightly depressed or dished to provide a cut-film seating depression 11, the surface of which is countersunk relative to the top or front surface plane of the body-member 10, to a depth approximating more or less the thickness of the cut-film or the like to be mounted on said body member.

Bordering one end of said seating depression 11 is an overhanging end flange 12 beneath which an end marginal portion of the applied cut-film or the like may be engaged and held at such point against displacement from the seating surface of said depression 11. In like manner, bordering the respective sides of said seating depression 11 are similar overhanging side flanges 13 beneath which the side marginal portions of the applied cut-film or the like may be engaged and held against displacement from the seating surface of said depression 11. Preferably said end and side flanges 12 and 13 are struck out of portions of the main body 10 adjacent the margins of said seating depression 11, and are turned upwardly and inwardly to overhang the seating surface in outwardly spaced relation thereto, whereby the flanges are integral with the main body. It will be obvious, however, that said flanges could be formed as separate elements and then suitably attached to the main body, by soldering, welding or other suitable fastening thereto in the described operative relation to said seating depression. It is preferable to so shape the free edge portions of the side flanges 13, as to provide therealong downwardly inclined lips 14, which lips cooperate with inclined side marginal portions 15 of the depressed seating surface area in such manner as to produce a slight downwardly directed transverse bending pressure on the marginal portions of an inserted cut-film, whereby the latter is so stressed as to cause the same to press flatly upon and against the seating surface area, thus being held against bulging or similar distortion which, if permitted, might result in distortion of the image photographed onto the cut-film when the latter is exposed within a camera. The end flange 12 is preferably disposed in a plane substantially parallel to the plane of the main body 10, so as to facilitate entrance of an inserted cut-film thereunder.

To facilitate entrance of the leading end of a cut-film beneath the side flanges 13, when loading the holder or adapter, especially when the loading operations are carried on in the dark or in the subdued light of a dark-room, portions of the receiving ends of said side flanges 13 are cut away to leave upstanding guide members 13', between which the leading end of the cut-film may be laid so as to align the side margins thereof with the internal channels formed by said side flanges 13 as spaced from the floor of the seating depression 11. These guide members 13' will conveniently center the cut-film between the side flanges 13, so that as the cut-film is slid into place it will readily pass between and under the latter.

In a simple form of the auxiliary holder or adapter, merely the side flanges 13 and one end flange 12 may be provided, leaving the opposite end of the seating surface 11 open for entrance and withdrawal of the cut-film or the like. In a somewhat superior form of the device as shown, however, manipulatable means is provided for opening and closing the open end of the seating depression 11 at will. As shown, this means comprises a keeper plate 16 provided at its rear margin with spaced tubular hinge knuckles 17 which are alignable with fixed hinge knuckles 18 springing from the body member 10; being preferably struck up from and formed out of the material of said body member. Extending through the knuckles 17 and 18 is a hinge pintle 19. A portion of said hinge pintle 19 is exposed intermediate spaced pairs of said cooperating knuckles 17 and 18, and extending around said pintle is a coil spring 20, having one terminal 21 bearing on the body member 10, and the other terminal 22 bearing on the keeper plate 16. The exerted tension of said spring is adapted to yieldably hold the keeper plate down-turned across the open end of the seating depression 11 so as to close the same. The free marginal portion of said keeper plate 16 is formed to provide an upwardly or outwardly offset lip 23 which is adapted to lap the adjacent end marginal portion of a cut-film inserted in the seating depression, whereby to hold said cut-film against outward shift or displacement. Whether the auxiliary holder or adapter is withdrawn from a plate-holder or remains therein, said keeper plate 16 may be easily swung back, against the tension of the spring 20, to permit insertion of a cut-film or to give access to the end of the cut-film for withdrawal thereof, as the case may be. To facilitate manipulation of the keeper-plate, a raised finger engageable member 16' may be provided in connection with the free marginal portion of the lip 23. By means of this member 16' the keeper-plate may be easily lifted and swung back to open position (such open position thereof being shown by full lines in Figs. 3 and 4). An opening 24 may be provided in the seating depression 11 through which the manipulator's finger may be passed to initially raise the end of cut-film so that it can be easily engaged and withdrawn from the holder or adapter.

When a cut-film F has been inserted into the auxiliary holder or adapter, so as to be lodged in the seating surface depression and so that its margins are engaged beneath the side flanges 13 and end flange 12, and, where provided, the keeper plate 16 is thereupon closed, the thus loaded auxiliary holder or adapter is ready to be, in turn, inserted within a compartment of a camera plate holder 25. The plate holder compartment is usually equipped with a sheath 26 having inturned side flanges 27 which overhang raised longitudinal beads 28; a sheath of this kind being shown and described in United States Patent No. 1,351,998 of September 7, 1920. The plate-holder 25 is also provided, at the rear end of its compartment, with a hinged gate section 29 which may be swung open to give access to the sheath and its side flanges 27. Upon opening this gate section 29 (as shown in Fig. 1) the loaded auxiliary holder or adapter may be entered endwise into the plate-holder compartment, and slid into the sheath 26 thereof so that the side marginal portions of said holder or adapter enter beneath the side flanges 27 of the sheath, whereby to be engaged and held between these flanges 27 and the underlying beads 28 of said sheath. Preferably the side marginal portions of the auxiliary holder or adapter are provided, along a portion of the length thereof, with stiffening beads 30 which prevent the holder or adapter from being bent or distorted from its normal flat condition. These stiffening beads 30, however, terminate short of the rearward end portion of the auxiliary holder or adapter, so as to leave said rearward end portion capable of a limited flexing movement, which will permit the same to be lifted, thus facilitating initiation of outward sliding movement of the holder or adapter, when withdrawal thereof from the plate holder compartment is desired to be accomplished. If desired, this somewhat flexible rear end portion of the auxiliary holder or adapter may be provided with a finger engageable opening 31 to facilitate manipulation thereof.

After the loaded auxiliary holder or adapter has been entered in the plate-holder compartment, the gate section 29 of the latter is closed, and the slide panel 32 of the plate-holder is also closed, thus loading the plate-holder compartment with small size cut-film.

It will be noted that the auxiliary holder or adapter not only retains the small size cut-film in flatly disposed condition within the plate-holder compartment, but also locates the same in substantial alignment with the optical center of the lens of the camera with which the plate-holder containing the auxiliary holder or adapter is used.

Some changes could be made in auxiliary holder or adapter structure herein shown and described without departing from the scope of this invention as defined in the following claims. It is therefore intended that all matter contained in the above description or shown in the accompanying drawings shall be interpreted as illustrative and not in a limiting sense.

I claim:

1. An auxiliary holder for loading undersized cut-film or the like in a camera plate-holder comprising, a flat main body of sheet material adapted to be slidably entered beneath and between film retaining side flanges of a plate-holder compartment, said main body having a substantially centrally located countersunk cut-film seating depression formed therein, said seating depression being of a depth substantially equal to the thickness of cut-film to be accommodated therein, and cut-film retaining flanges struck from outlying portions of said main body adjacent to an end and side margins of said seating depression, said flanges being disposed in overhanging relation to said seating depression.

2. An auxiliary holder for loading undersized cut-film or the like in a camera plate-holder comprising, a flat main body of sheet material adapted to be slidably entered beneath and between film retaining side flanges of a plate-holder compartment, said main body having a substantially centrally located countersunk cut-film seating depression formed therein, said seating depression being of a depth substantially equal to the thickness of cut-film to be accommodated therein, cut-film retaining flanges struck from outlying portions of said main body adjacent to one end and both side margins of said seating depression, said flanges being disposed in overhanging relation to said seating depression, and a spring closed keeper plate hingedly connected to said main body across the opposite end marginal portion of said seating depression.

3. An auxiliary holder for the purposes described as defined in claim 1 wherein, upstanding cut-film registering and guide means extend from the receiving end portions of the film retaining flanges which border the side margins of the seating depression.

GEORGE F. NEUSCHAFER.